United States Patent
Narioka

[11] Patent Number: 6,148,090
[45] Date of Patent: *Nov. 14, 2000

[54] APPARATUS AND METHOD FOR PROVIDING MAP INFORMATION IN IMAGE FORM

[75] Inventor: Hiroto Narioka, Kanagawa, Japan

[73] Assignee: Sony Corporation, Tokyo, Japan

[*] Notice: This patent is subject to a terminal disclaimer.

[21] Appl. No.: 08/966,944

[22] Filed: Nov. 10, 1997

[30] Foreign Application Priority Data

Nov. 18, 1996 [JP] Japan .................................. 08-306790

[51] Int. Cl.⁷ .............................. G06K 9/00; G08G 1/123
[52] U.S. Cl. ........................... 382/113; 382/305; 701/202
[58] Field of Search .................................... 382/201, 103, 382/113, 284, 305, 306; 348/118; 340/995; 701/24, 25, 28, 201, 202, 208, 209, 211, 212

[56] References Cited

U.S. PATENT DOCUMENTS

| | | | |
|---|---|---|---|
| 5,113,185 | 5/1992 | Ichikawa | 340/995 |
| 5,168,452 | 12/1992 | Yamada et al. | 364/444 |
| 5,378,969 | 1/1995 | Haikawa | 318/568.12 |
| 5,471,205 | 11/1995 | Izawa | 340/995 |
| 5,559,707 | 9/1996 | DeLorme et al. | 364/443 |
| 5,638,116 | 6/1997 | Shimoura et al. | 382/103 |
| 5,802,492 | 9/1998 | DeLorme et al. | 701/200 |
| 5,832,406 | 11/1998 | Iwami et al. | 701/202 |
| 5,874,905 | 2/1999 | Nanba et al. | 430/995 |
| 5,974,357 | 10/1999 | Poonsaengsathit et al. | 701/210 |
| 5,982,301 | 11/1999 | Ohta et al. | 340/995 |

OTHER PUBLICATIONS

U.S. Patent Application No. 08/963,697, filed Nov. 4, 1997, Narioka.

O'Leary, "Mapquest and Maps On Us: Top Web Map Services," *Online*, vol. 21, No. 5, Sep./Oct. 1997, pp. 56–58.

"Geosystems' MapQuest Unveils the Most Customizable Driving Directions Available on the Web," Geosystems Global Corporation press release, May 27, 1997, located at URL: http://www.geosys.com/cgi–bin/genobject/pr_MQ-custdirections/tig75b5.

*Primary Examiner*—Andrew W. Johns
*Attorney, Agent, or Firm*—Limbach & Limbach LLP

[57] ABSTRACT

An apparatus for providing map information includes a route calculating module for extracting crossing information on a map, a navigation guidance generating module for generating images near the crossing extracted and a rally map generating module for disposing the generated images near the crossing in fixed sequence, and is constructed to output the images of the crossing disposed in the fixed sequence. Therefore, even if a personal computers are not provided with the same software and a navigation apparatus made by the same manufacturer and a portable computer are not carried, it is able to provide the apparatus for providing map information that is possible to provide or use easily to understand searched route information.

21 Claims, 5 Drawing Sheets

APPARATUS AND METHOD FOR PROVIDING MAP INFORMATION IN IMAGE FORM

BACKGROUND OF THE INVENTION

1. Field of the Related Art

The present invention relates to an apparatus for providing map information to a user by printing out the map information or displaying it on a display apparatus, a method for providing the map information and information recording medium.

2. Description of the Related Art

Conventionally, in a personal computer provided with map display and route searching software and a navigation apparatus (including not only a car navigation apparatus but also a portable navigation apparatus), for example, in the case of searching for a route and providing the searched route to others, the route data obtained by searching is recorded to, for example, a medium such as a memory card or a floppy disk, and is supplied to a personal computer having the same software or a navigation apparatus (a compatible apparatus) made by the same manufacturer and is reproduced.

However, such route data can be exchanged only between personal computers having the same software or navigation apparatuses made by the same manufacturer. Therefore, in the case of personal computers not having the same software and navigation apparatuses made by other manufacturers which are not compatible, it is impossible to use such route data. It is needless to say, that it is impossible to provide such route data to others who do not have the personal computer and navigation apparatus.

Further, even if not in possession of the navigation apparatus, if in possession of a portable personal computer with, for example, the same software, it is possible to be provided with such route data. However, in the case of not having the respective portable personal computer, it is impossible to be provided with such route data. This is similar in case of not only providing such route data to others and but also wanting to use it for oneself. That is to say, in the case of having only a desk top type personal computer but not' having the portable personal computer, it is impossible to use such route data for oneself.

On one hand, some kinds of map display and the route searching software for personal computers are able to express such route data as to a sentence and to print out this sentence. If it is possible to print out the route guidance information like this, it is possible for others to be provided the route guidance information even if they do not have a personal computer with the same software and a navigation apparatus made by the same manufacturer nor a portable personal computer. However, in this case, it is hard for the user to intuitively understand the route guidance information, including the sentence mentioned above. Therefore, route guidance information which is easier to understand is desired.

SUMMARY OF THE INVENTION

The present invention is executed referring to the circumstances as mentioned above. An object of the present invention is to provide an apparatus, a method for providing map information and an information recording medium, all of which make it possible to provide easily understood and used searched route information without a navigation apparatus made by the same manufacturer or a portable personal computer.

The present invention, in order to solve the above mentioned problems, is characterized by extracting passing point information from a route between at least two points on map data, generating image data near a passing point according to the passing point information extracted, disposing the image data near the crossing point in order according to the route between two points and outputting it.

That is to say, according to the present invention, it is possible to provide easily understood searched route information without the same software in a personal computer nor a navigation apparatus made by the same manufacturer, nor a portable computer. This is accomplished by laying out an image at each passing point on the searched route in a fixed sequence and outputting the image.

DESCRIPTION OF THE PREFERRED EMBODIMENTS

The preferred embodiments according to the present invention will be described with reference to appended drawings.

Figure 1:
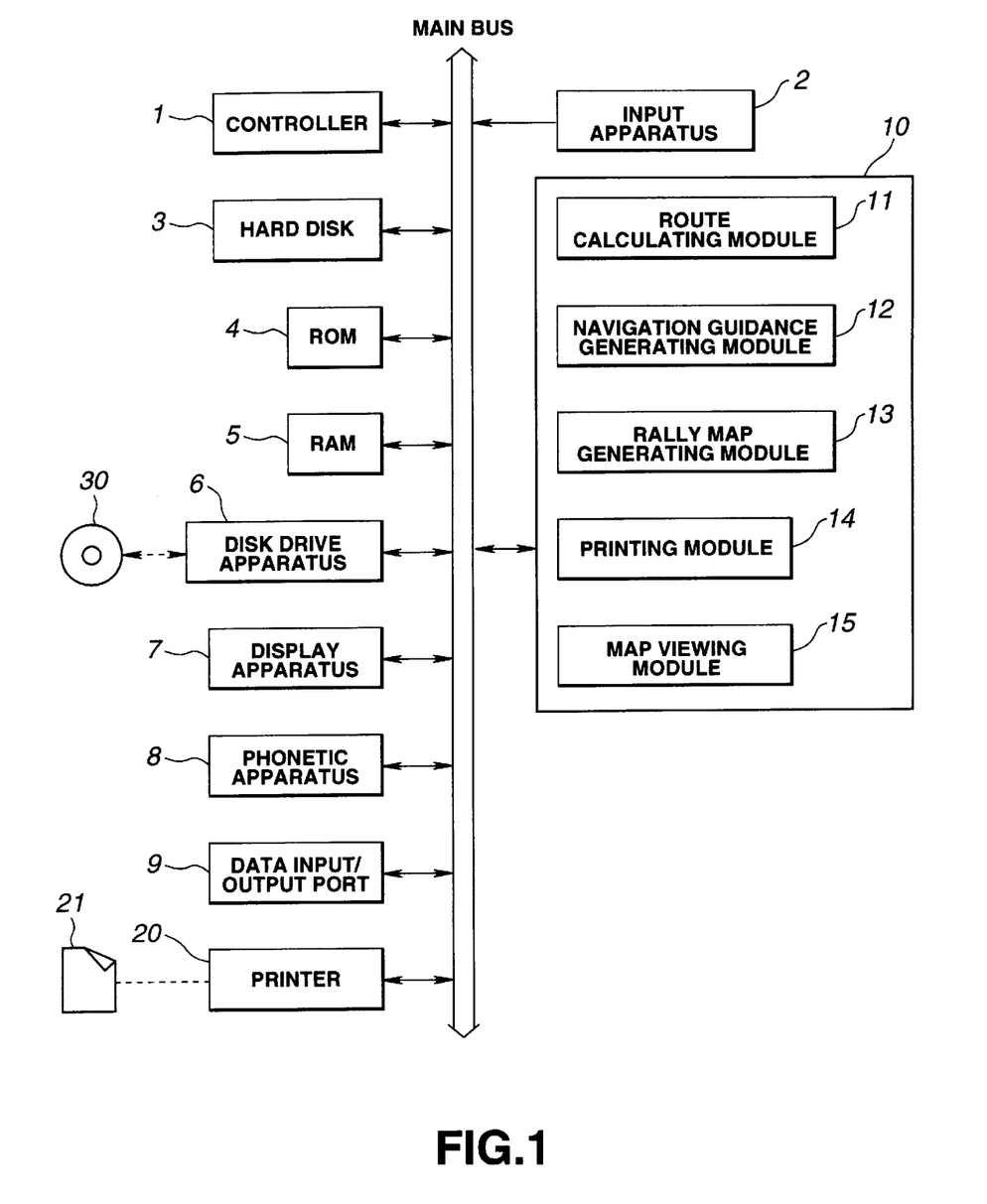
FIG. 1 is a block diagram showing the whole structure of an apparatus for providing map information according to the present invention.

The structure of an embodiment of an apparatus for providing map information according to the present invention is shown in FIG. 1.

In FIG. 1, each component is connected to a controller 1 including, for example, a CPU (the Central Processing Unit) through a main bus. The controller 1 and each component are described in turn as follows.

The controller 1 operates corresponding to, for example, an OS (Operating System) and application software stored in hard disk 3 and each kind of program stored in the ROM 4, and controls operation of each component connected through the main bus.

The hard disc 3 is provided for storing the OS and the application software and for recording/reproducing text, image, voice data and other types of file data. In the apparatus for providing map information according to the present invention, it is also used for recording and reproducing the image data that amount of data is particularly large such as a map.

The RAM 5 is work memory for storing temporarily data in processing mainly data in the controller 1, and temporarily stores the data used at each part such as a route calculating module as below mentioned if possible.

An input apparatus 2 includes a mouse, a keyboard, a touch switch and a pen input apparatus and coverts input from a user to usable data inside the apparatus. In the apparatus for providing map information according to the present invention, input apparatus 2 is used for inputting the setting information of the appointed points, such as a starting point, destination and a passing place necessary for automatic route searching, and the setting of information regarding the calculation conditions of priority of distance, time, etc. for automatic route searching. The priority of distance means to automatically search, for example, for the shortest route and the priority of time means to automatically search for the route where the estimated necessary time is the shortest.

A disc drive apparatus 6 not only drives a disk type recording medium, such as a CD-ROM disk and a floppy disc, but also writes the data recorded in the respective disk type recording medium, writes the data when the respective disk type recording medium is recordable, etc. In the present embodiment, the CD-ROM disk (a map disc 30) on which digital map data is recorded is loaded in the disk drive apparatus 6, which reads the digital map data recorded on the map disk 30. On the map disk 30, not only the image data of the map but also information such as a distance on the map, legal limited speed, the number of signals on a road, the number of lanes on the road and a list of crossings, guide information for sightseeing a shopping guide, voice information for route guidance, other sound information, text information of characters, etc. are recorded. Further, disk-type recording medium includes not only the CD-ROM as mentioned above but also an optical disc such as DVD (digital video disk).

A data input/output port 9 includes not only, for example, a terminal for inputting/outputting digital data, but also, for example, an inserted part into which a semiconductor memory element such as a memory card is inserted, etc.. In the present embodiment, the data is inputted/outputted through, for example, the terminal for inputting/outputting the data and the memory card and to a portable electronic information terminal with a display through the data input/output port 9. The digital map data is supplied through not only the map disk 30 but also the data input/output port 9, for example, correspondence.

Any kind of display means such as, for example, a CRT (Cathode Ray Tube), a liquid crystal display and a plasma display is applied as a display apparatus 7, which generates an image signal according to the image and the text data generated as below mentioned and displays an image, a character and so on corresponding the image signal. The map image, and the character, etc. are mainly displayed on the display screen of the display apparatus 7 of the apparatus for providing map information according to the present embodiment.

A map viewing module 15 displays a wide area map on the display screen of the display apparatus 7 as the fundamental screen of the map display software used for the present embodiment. That is to say, it reads the wide area map data from the map disk.30 and displays it through display apparatus 7. The screen on which the representative wide area map is displayed is called a guidance window as follows. On the guidance window, it is possible to set, scroll and zoom (enlarge/contract) the information such as a starting place, a destination, etc. by, for example, using a mouse of the input apparatus 2.

A phonetic apparatus 8 generates an analog sound signal from, for example, sound data generated by the controller 1 and pronounces the analog sound signal from a speaker.

The route calculating module 11 refers to each parameter about the distance information read from the map disk 30 and the road information (such as the legal limited speed, the number of signals, the number of lanes, one-way traffic and restricted information) and calculates the optimum route according to either calculating condition parameter of the priority of time or distance inputted from the input device 2 by automatically searching the route. Of course, it is also possible to calculate not only the route for a car but also the optimum route for a walking man and a running bicycle. In this case, a parameter such as the man's walking speed and bicycle's running speed is referred to from the map disc 30. Further, in case of finding the route for the man and the bicycle, it is possible to find the route through which a car can not pass.

A module 12 for generating navigation guidance generates all the information necessary for the navigation guidance of the respective route according to the route data calculated by the route calculating module 11. Substantially, the respective navigation guidance generating module 12 generates the picture data such as the enlarged picture of each crossing (a form of each crossing) necessary for the navigation guidance of the respective route, a land mark, a signal, an arrow showing the progressing direction and a road sign such as a restricted area and the guidance information necessary for the route guidance according to the route data calculated by the route calculating module 11 referring the map data recorded on the map disk 30. Further, the navigation guidance generating module 12 generates the information for displaying on the display screen by forming the window for displaying the enlarged picture (a navigation window) of the pop-upped crossing on the guidance window on which the wide area map is displayed. That is to say, then the navigation guidance generating module 12 constructs the information for displaying on the navigation window of each crossing displayed in order of the route referring to the picture data such as the enlarged picture of each crossing previously generated and the land mark and the guidance information. The guidance information includes, for example, position information of the crossing (an approximate position), a name of crossing, a distance between crossings, a name of road, the direction to go forward at each turning point, text information such as characters showing the land mark shown on the map, composite voice information in case of making a guidance about them by voice and so on. The picture data such as the enlarged map at each crossing and the guidance information are stored into the RAM 5 or the hard disc 3 once.

A rally map generating module 13 not only displays by pop-upping the navigation window on the guidance window on which the wide area map is shown according to the information supplied from the navigation guidance generating module 12, but also generates the information for displaying an icon used in choosing whether the enlarged picture of each crossing is necessary for the route navigation or not and displays it. Further, the respective rally map generating module 13 generates an image of the enlarged picture of each crossing chosen because it is necessary for the route navigation by the icon and the character line necessary for the route guidance are laid out easily to see, and the text information such as the name of position of each crossing displayed in order of the route as the additional information particularly necessary for the guidance of each crossing and the name of the previous crossing. Here, the image that the enlarged picture of each crossing and so on and the character line necessary for the route guidance are laid out means the image that the enlarged map of each crossing chosen. because it is necessary to reach the destination is laid out easily to see in order of the route and the character line such as the additional information for the guidance corresponding to each crossing is entered. The image laid out as above mentioned is called a rally map as follows. The rally map is made as a precondition to print as, for example, the size of A4 which is, for example, the standard of the size of paper of Japan Industrial Standard is in the longitudinal direction.

A printing module 14 generates printing data for printing longitudinally the respective rally map to, for example, paper of the size of A4 from data of the rally map generated by the rally map generating module 13.

A printer 20 prints longitudinally the rally map to a paper 21 of the size A4 according to the printing data supplied from the printing module 14.

The route calculating module 11, the navigation guidance generating module 12, the rally map generating module 13, the printing module 14 and the map viewing module 15 include software and are stored into the memory apparatus 10. The memory apparatus 10 includes, for example, the hard disk drive, the semiconductor memory, the CD ROM, etc., and may be the hard disk 3, the ROM 4, the RAM 5 or the map disk 30.

Figure 2:
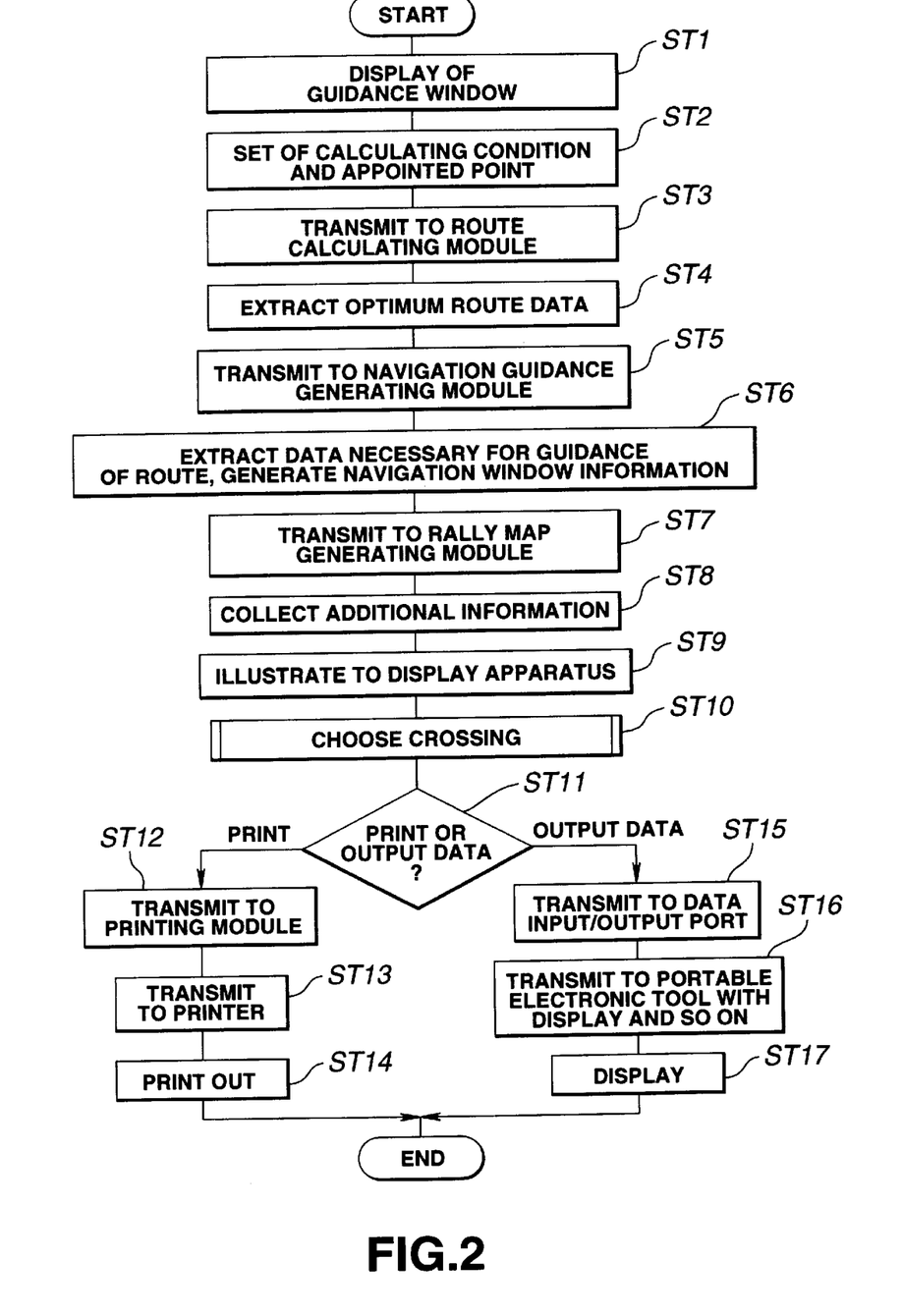
FIG. 2 is a flowchart showing flow of processing in an apparatus for providing map information according to the present invention.

Next, in the apparatus for providing map information having the structure in FIG. 1, actuation from the automatic route searching to generating and printing of the rally map is realized along the flowchart shown in FIG. 2.

In the flowchart as shown in FIG. 2, at step ST1, the map viewing module 15 displays the wide area map on the display apparatus 7.

At the next step ST2, a user inputs settings corresponding to calculation conditions (e.g. whether a distance or time is a priority) from the input apparatus 2 by using the wide area map displayed as a guidance window and also inputs settings of the appointed point, such as a starting point, a destination and a passing place that are necessary for automatically searching the route.

At a step ST3, the calculating condition input at step ST2 is transmitted as the calculating condition parameter and the appointed points (such as the starting point, the destination and the passing place) are transmitted as latitude/longitude data to the route calculating module 11.

At step ST4, the optimum route data (the route data) is extracted, using the calculating condition parameter and the latitude/longitude data, by the route calculating module 11. The route data substantially includes the list of each crossing on the route.

At step ST5, the extracted optimum route data (that is to say, the data list of each crossing on the route) is transmitted to the navigation guidance generating module 12.

At step ST6, the navigation guidance generating module 12 generates all the information necessary for the navigation of the respective route according to the optimum route data calculated by the route calculating module 11. That is to say, the navigation guidance generating module 12 refers to the map data recorded on the map disk 30 and chooses each crossing particularly necessary for the navigation guidance from the list of each crossing of the optimum route obtained from the route calculating module 11, and extracts the picture data (such as the enlarged picture of each chosen crossing), the land mark, the signal, the arrow showing the proceeding direction and the road sign (such as the restricted area) and the guidance information necessary for the guidance of the route. Further, at step ST6, the navigation guidance generating module 12 generates the information for displaying the navigation window.

At step ST7, the list data of the crossing and the data necessary for the guidance chosen by the navigation guidance generating module 12, and the data for displaying the navigation window are transmitted to the rally map generating module 13.

At step ST8, the rally map generating module 13 collects the additional information necessary for the guidance of each crossing displayed in order of the route according to the list data of each crossing chosen as it is necessary for the navigation and the guidance information necessary for the guidance.

At step ST9, the navigation window is displayed on the guidance window.

Figure 3:
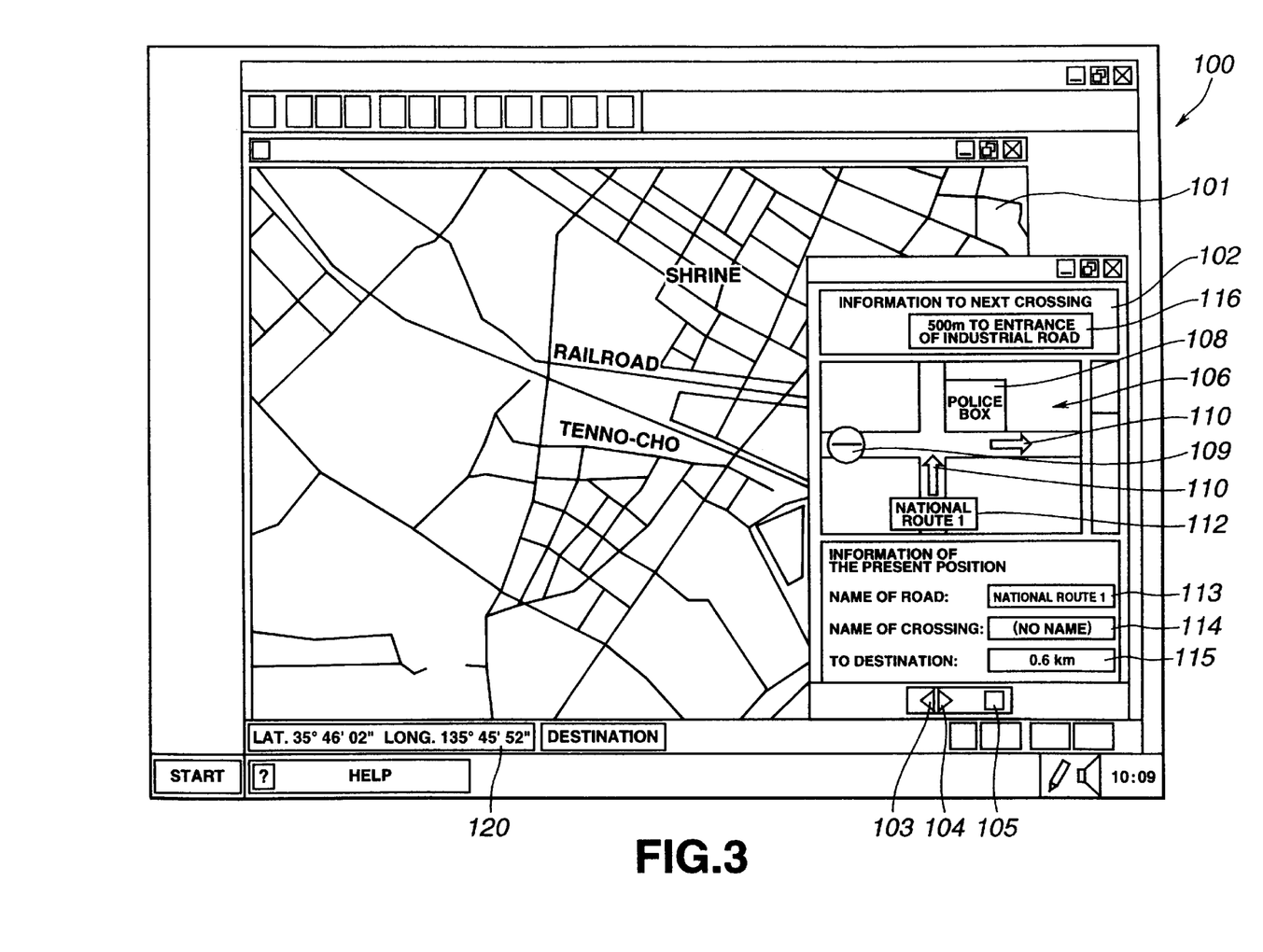
FIG. 3 is a drawing showing an embodiment that a guidance and a navigation window are displayed on a display screen.

FIG. 3 shows one embodiment of a guidance window 101 and a navigation window 102 displayed on a display screen 100 of the display apparatus 7. That is to say, in FIG. 3, for example, the guidance window 101 is pop-upped on the display screen 100, in the guidance window 101. A number line 120 showing the wide area map, the name of the destination and the latitude and the longitude of the present displayed point are also displayed. The navigation window 102 is also pop-upped on the respective guidance window 101. In the navigation window 102, the enlarged map 106 of a crossing of each crossing is displayed in order of the route. Further, in the enlarged map 106 of the crossing of the navigation window 102, for example, the landmark 108 of "a police box" is displayed, further, the name of the road (in this embodiment, the character line 112 of "National Route 1"), the road sign mark 109 of the restricted area and the arrow mark 110 showing the progressing direction are also displayed. Outside of the respective enlarged map 106, the distance information from the crossing to the next crossing such as, for example, "500 m to the entrance of the industrial road" is displayed as the information to the next crossing, the words of, for example, "National Route 1" are displayed as the name of the road, the words of the name of the crossing ("No Name" because there is no name of the respective crossing in the embodiment in FIG. 3), and the words of, for example, "0.6 km" are displayed as the distance to the destination.

Further, in the navigation window 102, the icon 105 for directing whether choosing the enlarged map 106 of the respective crossing or not as the icon used in choosing whether the enlarged picture and so on of the respective crossing are necessary for the route navigation or not, the icon 104 for directing to go forward to the display of the navigation window corresponding to the next crossing and the icon 103 for directing to return to the display of the navigation window corresponding to the previous crossing are also displayed. The direction corresponding to each icon is executed by, for example, moving a mouse cursor on the icons 103, 104 and 105 and clicking.

That is to say, at step ST10 in FIG. 2, the operation information from the input apparatus 2 operated by the user of the respective apparatus for providing the map information, and the rally map generating module 13 chooses whether the enlarged image data and the guidance information of each crossing are necessary or not to know the route to reach the destination and registers the respective chosen crossing about the enlarged image of each crossing displayed in the navigation window in order of the route as above mentioned. Therefore, when it is not necessary, the registration of the respective crossing is not executed. The choice that the enlarged image data and the guidance information of each crossing are necessary for knowing the route to reach the destination is directed by user's clicking the icon 105. The detail of the choice processing of the crossing at the step ST10 is described below. When the enlarged image of each crossing displayed in order of the route is chosen at the step ST10, the respective rally map generating module 13 generates the rally map in which the word lines and so on necessary for the enlarged picture and so on of each crossing and the guidance are laid out. Though there are cases that the image of the rally map is displayed on the display screen, it must not be displayed.

At the next step ST11, it is judged whether or not the image of the rally map is printed or the image data of the respective rally map is outputted to, for example, the portable electronic information terminal with the display.

When it is inputted by the input apparatus 2 to print, the image data of the rally map is transmitted to the printing module 14 at the step ST12 and the printing data is generated.

At step ST13, this printing data is transmitted to the printer 20.

At step ST14, printing according to the respective printing data is executed by the printer 20 and the rally map is printed out to paper 21 of size A4.

On one hand, when it is judged to output the data at the step ST11, the image data of the rally map is transmitted to the data input/output port 9 at the step ST15.

At the step ST16, the image data of the rally map is outputted from the data input/output port and is transmitted to, for example, the portable electronic information terminal with the display.

Thus, it is possible to display the rally map on the display, of the respective portable electronic information terminal as shown at the step ST17 after that.

Figure 4:
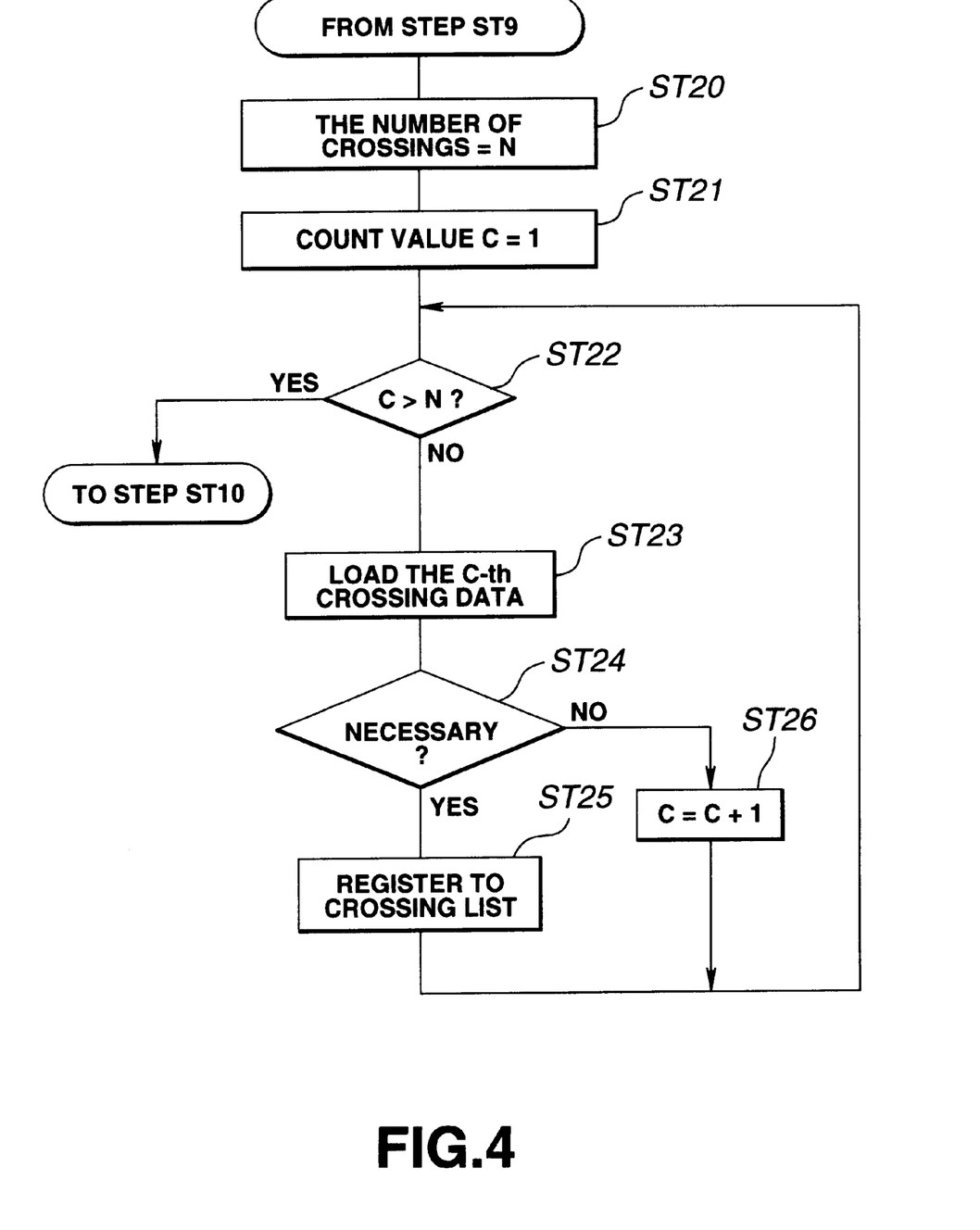
FIG. 4 is a flowchart showing flow of processing for choosing a crossing.

Here, the choosing processing at the step ST10 of the flowchart in FIG. 2 is executed according to the process as the flowchart in FIG. 4.

In the flowchart in FIG. 4, a variable N is set as the number of crossings at the step ST20 and the count values C are initialized to 1 at step ST21.

At step ST22, it is judged whether the count values C are larger than the variable N of the number of the crossings, when judged "NO" at the step ST22, progress to the step ST23. That is to say, in case of not finishing displaying up to the last crossing to reach the destination, proceed to the step ST23.

At the step ST23, according to the list data of the crossing and the guidance information, the enlarged image data of the crossing corresponding to the count values C and the guidance information, that is to say, the enlarged image data of the C-th crossing counted from the first crossing and the guidance information are read out from the RAM 5 or the hard disk 3.

At the step ST24, according to the input from the input apparatus 2, it is chosen whether the enlarged image data of the C-th crossing and the guidance information are necessary for knowing the route to reach the destination or not. Here, the choice that the enlarged image data of the C-th crossing and the guidance information are necessary is directed by user's clicking of the icon 105. Further, when the user chooses the icon 103 or 104, proceed from the step ST23 to ST24.

In case of judging "NO" at the step ST24, proceed to the step ST26, return to the step ST22 after adding 1 (increment) to the count values C at the step ST26 and return to process the data about the next crossing. Though the embodiment that the icon 104 is chosen by the user and 1 is added to the count values C to proceed to the next crossing is shown in this flowchart, in case that the icon 103 is directed by the user, decrease the count values C by 1 (decrement) at the ST26 and return processing of the previous crossing.

On one hand, in case of judging "YES" at the step ST24, proceed to the step ST25 and register as the data about the respective crossing is necessary for the rally map at the step ST25. Registration of the data of this rally map is substantially executed by storing into the RAM 5 or the hard disk 3. After that, return to the step ST22.

When the progress as above mentioned is executed and it is finally judged as "YES" at the step ST22, proceed to the step ST11 of the flowchart in FIG. 2. That is to say, when the process has been finished up to that about the last crossing for reaching the destination, proceed to the step ST11 of the flowchart in FIG. 2.

Figure 5:
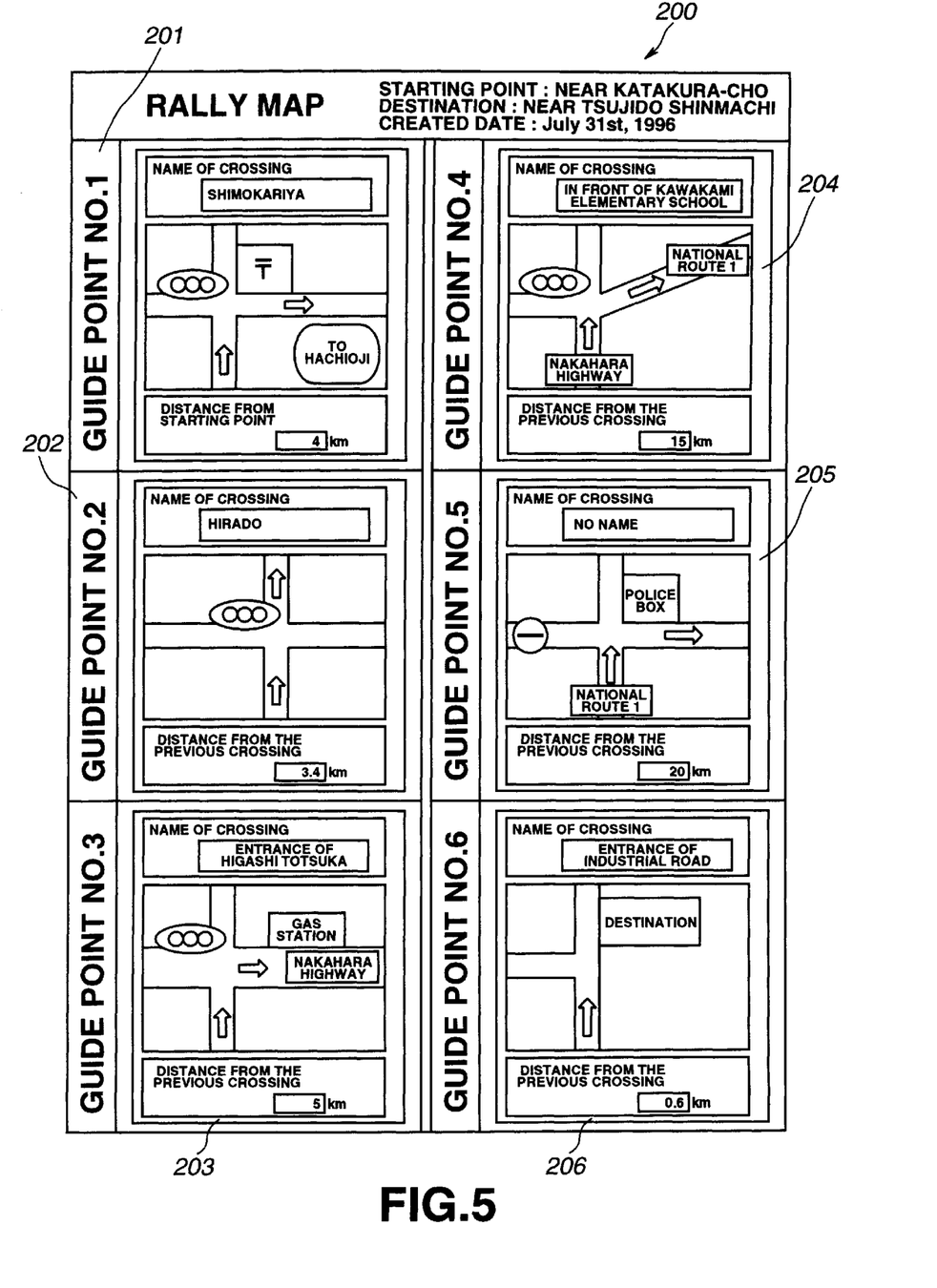
FIG. 5 is a drawing showing an embodiment of a rally map.

As the rally map printed on the paper 21 or displayed on the display of the portable electronic information terminal, for example, the rally map shown in FIG. 5 is given.

In FIG. 5, in a rally map 200, enlarged images 201 through 206 of, for example, chosen six crossings are laid out in order of the route. In each enlarged image, the number (Guide POINT NO.) showing the order that the respective crossing appears on the route respectively, the word line showing a name of crossing, a figure showing a distance from a starting point or the previous crossing, arrow marks showing the proceeding direction are illustrated and the land and the signal mark, a name of road and so on are illustrated as the occasion demands.

Referring to FIG. 5, the embodiment will be described in detail. In case of, for example, Guide Point NO.1, the enlarged map of the crossing of the respective Guide Point NO.1 shows the crossing called "Shimokoriya" at a distance from the starting point by 4 km and there are a signal and a post office as the landmark at the crossing. Further, at this crossing, it is shown to proceed from the lower side and change a course to the right at the respective crossing.

The next crossing is disposed, for example, under the figure of Guide POINT NO.1 as Guide POINT NO.2, the enlarged map of the respective crossing is at the distance of 3.4 km from the previous crossing (that is to say, the crossing of Guide POINT NO.1) and is called "Hirado," there is only the signal at this crossing, and it is shown to have to progress from the lower side of the figure and go straight on through the respective crossing.

The next crossing is disposed, for example, under the figure of Guide POINT NO.2 as Guide POINT NO.3, the enlarged map of the respective crossing is at the distance of 5 km from the previous crossing (the crossing of Guide POINT NO.2) and is called "Entrance of Higasgi Totsuka." There is only this signal at this crossing, and it is shown to have to progress along the road called "Nakahara Road" by which there is a gas station as the landmark when progressing from the lower side of the figure and changing a course to the right at the respective crossing.

Further, the next crossing is disposed, for example, at the right of the figure of Guide POINT NO. 1 as Guide POINT NO. 4, the enlarged map of the respective crossing is at the distance of 15 km from the previous crossing (the crossing of Guide POINT NO.3) and the respective crossing is the crossing that the right road of a crossroads is disposed in the slantedly upper direction to the progressing direction from the lower to the upper side of the figure. This crossing is called "In front of Kawakami Elementary School," there is only the signal at the respective crossing, and it is shown to have to progress along the road called "National Road NO. 1" by which there is a gas station as the landmark when progressing along the highway called "Nakahara Highway" from the lower to the upper side of the figure and changing a course in the slantedly upper right direction at the respective crossing.

The next crossing is disposed, for example, under the figure of Guide POINT NO. 4 as Guide POINT NO.5, the enlarged map of the respective crossing is at the distance of 20 km from the previous crossing (the crossing of Guide POINT NO. 4) and there is no name of the crossing. It is shown that there is to a police box" as the landmark at the respective crossing, the left side of the respective crossing is a restricted area, and it is shown to have to change the course to the right at the respective crossing when progressing along the road called "National Road NO.1" from the lower to the upper side of the figure and changing a course to the right at the respective crossing.

The next crossing is disposed, for example, under the figure of Guide POINT NO.5 as Guide POINT NO.6, the enlarged map of the respective crossing is at the distance of 0.5 km from the previous crossing (the crossing of Guide POINT NO.5) and this crossing is the T-type crossing called "The Entrance of the Industrial Road." It is shown that there is the destination after passing the respective crossing in the enlarged map when progressing from the lower to the upper side of the figure on the enlarged map.

Further, on the respective rally map, the date when the respective rally map was made and the names of the starting point and the destination are also entered.

The enlarged map of the crossing displayed on the navigation window 102 in FIG. 3 shows the embodiment in case that the enlarged image 205 of the crossing in FIG. 5 is displayed.

As above mentioned, in the apparatus for providing the map information of the embodiment according to the present invention, the rally map that the enlarged map of each crossing necessary for the route navigation and the guidance information are laid out in order of the route easily to see is printed out on a paper or are displayed on the display of the portable electronic information terminal. Therefore, even in the environment which is provided with the same map display and the search software, it is possible to move to the destination, to expand widely the using range and to realize the original function of the personal computer application impossible for the conventional car navigation system by the user's carrying of the rally map (a print and so on). Further, as on the rally map the information is constructed as the enlarged map is main, it is possible to provide more intuitively it than the information of only words.

The rally map as above mentioned is an example, as the layout which is more easily to see, it is also possible to use other layout except one shown in FIG. 5. Further, it is also possible to use other wide area map displayed in the guidance window and the enlarged map of the crossing shown on the navigation window and the rally map, and to display to get a bird's-eye view of it. Further, it is possible to make the display and the illustrated map including the solid image which is almost a real thing.

Though in the embodiment as above mentioned, the rally map is generated by extracting the crossing information from the map data and displaying it as the enlarged map on the navigation window 102, the passing point may be extracted at each fixed distance from the route calculated by the route calculating module 11, the map data near the passing point may be cut down by the size of m×n from the wide area map data, the navigation window 102 may be displayed according to the map data near the passing point cut down and the rally map may be generated.

As it is clear as above mentioned, according to the present invention, it is possible to easily provide or use the searched route information even if the personal computer is not provided with the same software and you do not have the navigation apparatus made by the same manufacturer and the portable personal computer.

What is claimed is:

1. An apparatus for providing map information comprising:

an information extraction means for extracting necessary passing point information from an optimum route between at least two points on map data, the necessary passing point information including information necessary for route navigation;

an image generation means for generating image data near a necessary passing point according to the necessary passing point information;

an image disposing means for disposing the image data; and an output control means for controlling output of images near the necessary passing point disposed be said means for disposing images.

2. The apparatus for providing map information according to claim 1, wherein said information extraction means extracts crossing information necessary for route navigation as said passing point information.

3. The apparatus for providing map information according to claim 1, wherein said image disposing means disposes the image data near the necessary passing point in order along the optimum route between at least two points on said map data.

4. The apparatus for providing map information according to claim 3, wherein said information extraction means extracts the necessary passing point information which is on the optimum route according to calculation of the route of shortest distance between at least two points on the map data.

5. The apparatus for providing map information according to claim 3, wherein said information extraction means extracts the necessary passing point information which is on the optimum route according to calculation of the route of shortest required time between at least two points on the map data.

6. The apparatus for providing map information according to claim 1, wherein said image disposing means disposes images near necessary passing points chosen by a user from images near plural necessary passing points generated by said image generation means.

7. The apparatus for providing map information according to claim 1, wherein said image generation means generates the image data such that route information is included in the image data.

8. The apparatus for providing map information according to claim 1, wherein said image disposing means disposes spatially the images near the necessary passing point on the same plane.

9. The apparatus for providing map information according to claim 8, wherein said output control means controls output for printing the images on paper.

10. The apparatus for providing map information according to claim 1, wherein said output control means controls output for transmitting image data to other terminal apparatus.

11. A method for providing map information comprising the steps of:

extracting necessary passing point information from an optimum route between at least two points on map data, the necessary passing point information including information necessary for route navigation;

generating image data near a necessary passing point according to the necessary passing point information extracted by said step for extracting information;

disposing the image data near the necessary passing point; and controlling output of images near the necessary passing point disposed in the disposing step.

12. The method for providing map information according to claim 11, wherein said extracting step extracts crossing information necessary for route navigation as said passing point information.

13. The method for providing map information according to claim 11, wherein said disposing step disposes the image data near the necessary passing point in order along the optimum route between at least two points on said map data.

14. The method for providing map information according to claim 13, wherein said extracting step extracts the necessary passing point information which is on the optimum route according to calculation of the route of shortest distance between at least two points on the map data.

15. The method for providing map information according to claim 13, wherein said extracting step extracts the necessary passing point information which is on the optimum route according to calculation of the route of shortest time required between at least two points on the map data.

16. The method for providing map information according to claim 11, wherein said disposing step disposes the images near necessary passing points chosen by a user from images near plural necessary passing points generated by said generating step.

17. The method for providing map information according to claim 11, wherein said generating step generates the images data such that route information is added to the image data near the passing point.

18. The method for providing map information according to claim 11, wherein said disposing step disposes spatially the images near the necessary passing point on the same plane.

19. The method for providing map information according to claim 18, wherein said output step controls output for printing on paper.

20. The method for providing map information according to claim 11, wherein said output control step controls output for transmitting data to other terminal apparatus.

21. A medium for recording information in which are recorded processing orders for:

extracting necessary passing point information from an optimum route between at least two points on map data, the necessary passing point information including information necessary for route navigation;

generating image data near a necessary passing point according to said necessary passing point information extracted;

disposing said image data near the necessary passing point generated in order according to said optimum route between two points; and outputting disposed images near the necessary passing point.

* * * * *